US006273212B1

(12) United States Patent
Husted et al.

(10) Patent No.: US 6,273,212 B1
(45) Date of Patent: Aug. 14, 2001

(54) LIGHTWEIGHT MANEUVERABLE POWER CHAIR

(75) Inventors: Royce H. Husted, 1294 Elkton Farm Rd., Forest, VA (US) 24551; Joel P. Husted, Forest, VA (US)

(73) Assignee: Royce H. Husted, Forest, VA (US)

( * ) Notice: Subject to any disclaimer, the term of this patent is extended or adjusted under 35 U.S.C. 154(b) by 0 days.

(21) Appl. No.: 09/503,068

(22) Filed: Feb. 12, 2000

(51) Int. Cl.[7] .................................................. B62M 23/02
(52) U.S. Cl. .......................... 180/907; 180/205; 180/221
(58) Field of Search ................................ 180/65.1, 6.48, 180/205, 221, 222, 907; 280/250.1

(56) References Cited

U.S. PATENT DOCUMENTS

| | | | | |
|---|---|---|---|---|
| 2,544,831 | | 3/1951 | Greyton | 180/6.62 |
| 3,763,945 | | 10/1973 | Danielson | 180/6.66 |
| 3,893,529 | * | 7/1975 | Karchak, Jr. et al. | 180/65.1 |
| 3,930,551 | * | 1/1976 | Cragg | 180/65.1 |
| 4,037,676 | * | 7/1977 | Ruse | 180/6.5 |
| 4,422,515 | * | 12/1983 | Loveless | 180/65.1 |
| 4,475,613 | | 10/1984 | Wacker | 180/22 |
| 4,759,418 | * | 7/1988 | Goldenfeld et al. | 180/65.1 |
| 4,805,712 | * | 2/1989 | Singleton | 180/65.1 |
| 5,078,227 | * | 1/1992 | Beker | 180/221 |
| 5,094,310 | * | 3/1992 | Richey et al. | 180/65.6 |
| 5,445,233 | * | 8/1995 | Fernie et al. | 180/6.5 |
| 5,477,935 | * | 12/1995 | Chen | 180/65.5 |
| 5,562,174 | * | 10/1996 | Chen | 180/65.5 |
| 5,730,236 | * | 3/1998 | Miller et al. | 180/65.1 |
| 5,735,363 | * | 4/1998 | Horovitz et al. | 18/205 |
| 6,050,356 | * | 4/2000 | Takeda et al. | 180/65.1 |
| 6,065,557 | * | 5/2000 | Von Keyserling | 180/221 |

* cited by examiner

*Primary Examiner*—J. J. Swann
*Assistant Examiner*—L. Lum
(74) *Attorney, Agent, or Firm*—Nicholas A. Camasto

(57) ABSTRACT

A lightweight, easily maneuverable and transportable power chair, that may be manually propelled, includes a pair of freely rotatable wheels and a corresponding pairs of friction rollers and braking surfaces that are selectively engageable therewith to effect propulsion and steering of the chair. A pair of toggle levers are operated by a corresponding pair of control handles for selectively engaging the friction rollers and brake surfaces with the wheels. A single caster wheel is vertically rotatable at the front of the power chair frame. This forms a tricycle rolling system that always maintains a load on each of the driving wheels.

7 Claims, 4 Drawing Sheets

LIGHTWEIGHT MANEUVERABLE POWER CHAIR

BACKGROUND OF THE INVENTION

This invention relates generally to mobile chairs and specifically to a power chair that is lightweight, capable of manual operation and easily transportable.

There are basically two types of mobile chairs; conventional, hand propelled wheelchairs and chairs that are powered (motorized), either by a battery or a gasoline engine. The term motorized as used herein is intended to apply to both battery power and engine power. Hand propelled wheelchairs have been manufactured for more than a century without significant changes in design. Generally hand rings are mounted adjacent to the large wheels to assist in propulsion by the user, although very often the wheel tires are grasped directly to propel the wheelchair. Such wheelchairs are satisfactory for indoor use where floors are usually flat and smooth. Outdoor operation on the other hand, presents challenging obstacles for a user. For example, soft ground and hills make it extremely difficult to travel with a hand propelled wheelchair. Therefore, some sort of powered wheelchair is considered very beneficial for outdoor use.

Most powered wheelchairs and powered scooters are battery driven and intended for outdoor as well as indoor use, but they are not suited to unpaved surfaces like grass, dirt and bumpy trails. The shopping cart scooter is the most popular and, while designed primarily for indoor use, it also sees limited outdoor service in transporting both the user and groceries across the store parking lot. Powered wheelchairs and scooters have been a boon to the handicapped and elderly. Most battery powered wheelchairs use two motors, left and right, each being associated with some form of reduction gearing. A joystick controls a fairly complicated electronic system for switching and modulating the requisite high current, low voltage, power. These arrangements are expensive and prone to service problems.

Scooters on the other hand, use only one motor which drives the wheels through a differential. While the costs and weight of a differential are about the same as an extra motor and gear reduction mechanism, the controls on the scooter are less complicated and the unit is generally more reliable than the two motor wheelchair. Steering of the front wheel of the scooter is accomplished with a small handlebar. Unfortunately, the scooters are not particularly maneuverable. These vehicles' major drawbacks of bulk and weight (generally in the range of 150 to 200 pounds), have prevented their widespread acceptance and use despite their obvious great benefits for outdoor use. They also require special measures in order to transport them.

One serious drawback is that the motors drive the wheels through gearing which cannot be overdriven. Thus a drive failure, or a dead or defective battery, can leave the 200 pound vehicle frozen in place with its wheels effectively locked and the user helplessly stranded. Generally a van, which has a large door, rather than a passenger automobile, is required to transport them. The van is usually equipped with a power lift of some sort to enable the loading and unloading of the motorized powered chair or scooter.

The present invention provides a power chair that is lightweight, compact and maneuverable and therefore well suited to hand propulsion. The preferred embodimnent of the invention is directed to a powered wheelchair, but it will be apparent that the invention will find ready use as a safe, transportation vehicle for use by all ages, irrespective of any infirmity. It's lightweight and small size enables it to be transported by automobile or van without special equipment and its long range permits it to be used in the country for sightseeing and the like.

While the preferred embodiment incorporates a compact gasoline engine, it should be understood that the invention is not to be so limited. The particular compact gasoline engine used is a 4-cycle Honda® engine, which finds application in hand equipment such as electric generators, water pumps, chain saws and weed trimmers. The engine is much lighter than a comparably sized electric motor, and is much quieter and cleaner burning than the 2-cycle engines normally used in such equipment. Whereas most battery powered chairs weigh from 150 to 200 pounds, and a conventional hand propelled wheelchair weighs around 40 pounds, the powered wheelchair version of the invention weighs only 35 pounds. As will be seen, the inventive power chair also employs a comfortable, removable, padded rigid seat, which, when removed, enables the power chair to be transported in the trunk of a compact automobile. In contrast, conventional hand powered, transportable wheelchairs require a flexible sling type seat and back, which are not comfortable for the user.

As mentioned above, the power chair of the invention is readily transportable in the trunk of a compact automobile and is easily hand propelled, when indoors, because of its lack of bulk, extreme light weight and excellent maneuverability. The gasoline powered version of the inventive power chair is presently preferred since it exhibits a much greater range of operation (approximately 45 miles per ½ gallon tank of gasoline) over a battery powered power chair of the same general design. Refilling the ½ gallon tank is also much faster and more convenient than recharging a battery from a household source of power.

Propulsion and steering of the inventive power chair is provided by selectively engaging the wheels with corresponding motor-driven friction rollers that are affixed to a rotatable drive axle. The engagement between the friction rollers and the wheels is controlled by a pair of manual control arms that the user moves forward for propulsion and backward for braking. This action is accomplished by a pivotally mounted rocker lever that carries a friction drive roller and a friction brake surface that are selectively engageable with the associated wheel. Normal turning is accomplished by engaging one friction roller with its corresponding wheel. Very tight turns may be made by simultaneously engaging one friction roller with its associated wheel and engaging the other brake surface with its associated wheel. Since the control arm arrangements are self centering, the wheels are normally in a free wheeling state.

In one version of the inventive power chair, provision is made for "hands free" steering through the use of a clutched drive lock system for holding both friction rollers in engagement with the wheels for forward propulsion. The clutched drive lock system also provides a "parking brake" to hold the power chair on inclined surfaces or to steady it for the user. The maneuverability of the inventive power chair derives from the transmission system discussed above and the provision of a front caster wheel that freely swivels in accordance with the directional forces developed by the wheels. The freely movable front caster wheel is also provided with a foot steering plate, generally for making slight steering corrections to compensate for road conditions and the like and is especially useful for hands free operation during relatively long distance travel, when the clutched drive lock system is engaged. As will be seen, the transmission system, including the motor, is movably supported on the power chair frame to permit the pivoting and translational movements of the drive axle.

OBJECTS OF THE INVENTION

A principal object of the invention is to provide a novel power chair.

Another object of the invention is to provide a compact lightweight, readily transportable power chair.

A further object of the invention is to provide a novel power chair of greatly improved range.

Still another object of the invention is to provide a novel powered wheelchair that may be hand propelled.

A still further object of the invention is to provide a more comfortable, easily transportable wheelchair.

BRIEF DESCRIPTION OF THE DRAWINGS

These and other objects and advantages of the invention will be apparent upon reading the following description in conjunction with the drawings in which.

DETAILED DESCRIPTION OF THE INVENTION

Figure 1:
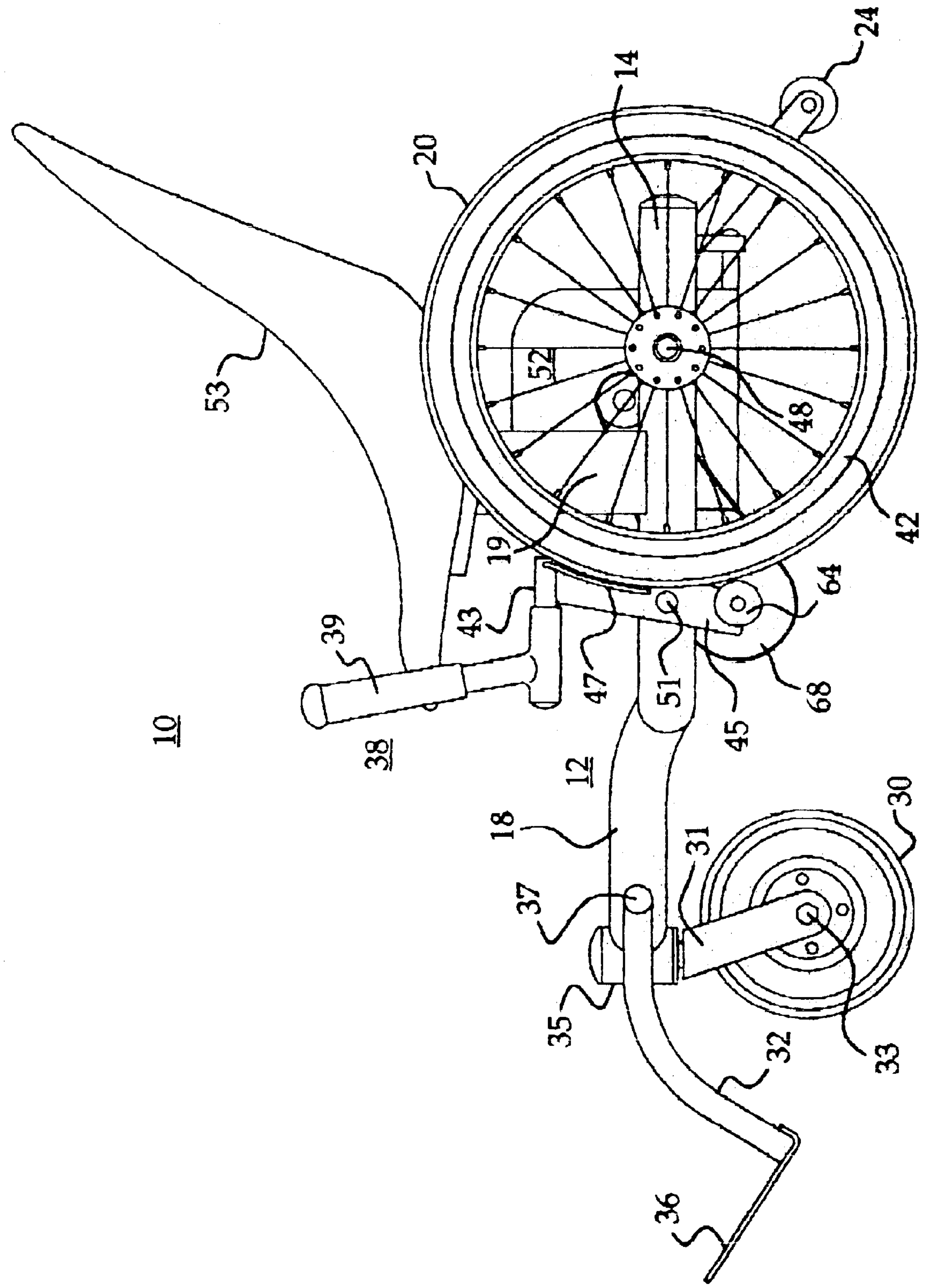
FIG. 1 is a side elevation of the power chair of the invention.
Figure 2:
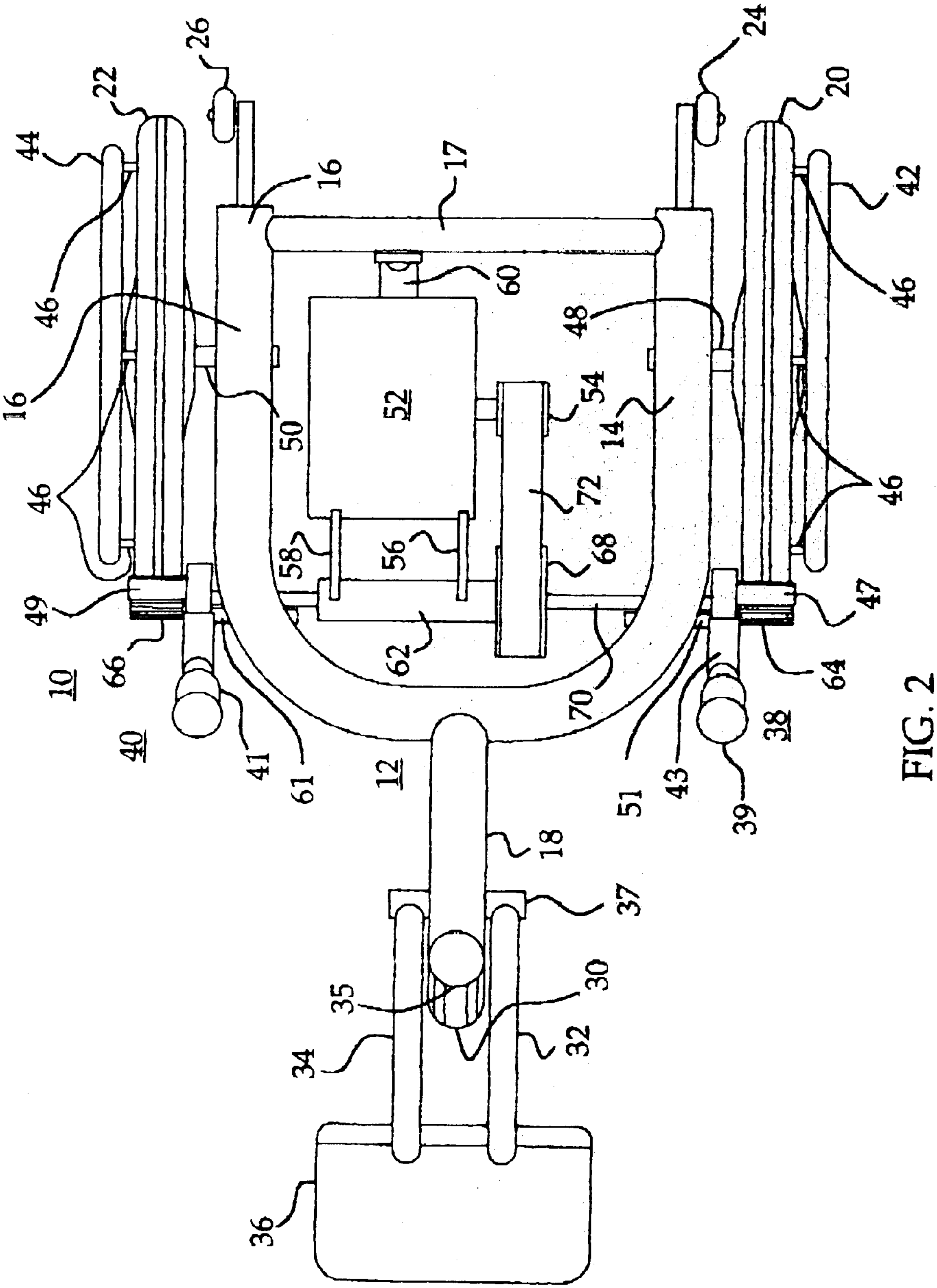
FIG. 2 is a plan view of the power chair of FIG. 1 with the seat removed.

Referring to the drawings generally and to FIGS. 1 and 2 in particular, a power chair 10 includes a lightweight aluminum tubular frame 12, to opposite sides of which a pair of wheels 20 and 22 are mounted for freewheeling rotation by a pair of stub axles 48 and 50, respectively. Frame 12 has a generally Y shaped configuration that includes a rearwardly extending U shaped section (formed by two rear legs 14 and 16), and a forwardly extending front leg 18. A rear frame member 17 is affixed to the ends of rear legs 14 and 16. The wheels 20 and 22 are conventional bicycle-like wheels with pneumatic tires, A pair of hand rings 42 and 44 are attached to wheels 20 and 22, respectively by a plurality of fasteners 46. A front caster wheel 30 rotates on a vertically oriented axle 33 that is secured in a fork 31. Fork 31 is rotatable in a hub 35 that is located at the end of front leg 18. The three wheel arrangement is very stable and is especially beneficial when the power chair is used on non uniform surfaces, because each of the three wheels is always in contact with the ground.

A user foot rest 36 is supported forwardly of the end of front leg 18 by a pair of curved side supports 32 and 34 that are pivotally secured to front leg 18 by a pivot 37. A contoured, relatively rigid seat 53 is secured to rear legs 14 and 16 of frame 12 by a pair of uprights, only one of which (19) is visible in the figures. Seat 53 is preferably readily removable to enable the power chair to be conveniently stowed in the trunk of a compact size automobile. Two small wheels 24 and 26 extend from the rear of frame 12 to limit the maximum elevation that caster wheel 30 may experience. These wheels are normally not operational unless caster wheel 30 is elevated to a height that could result in an unstable condition.

Figure 3:
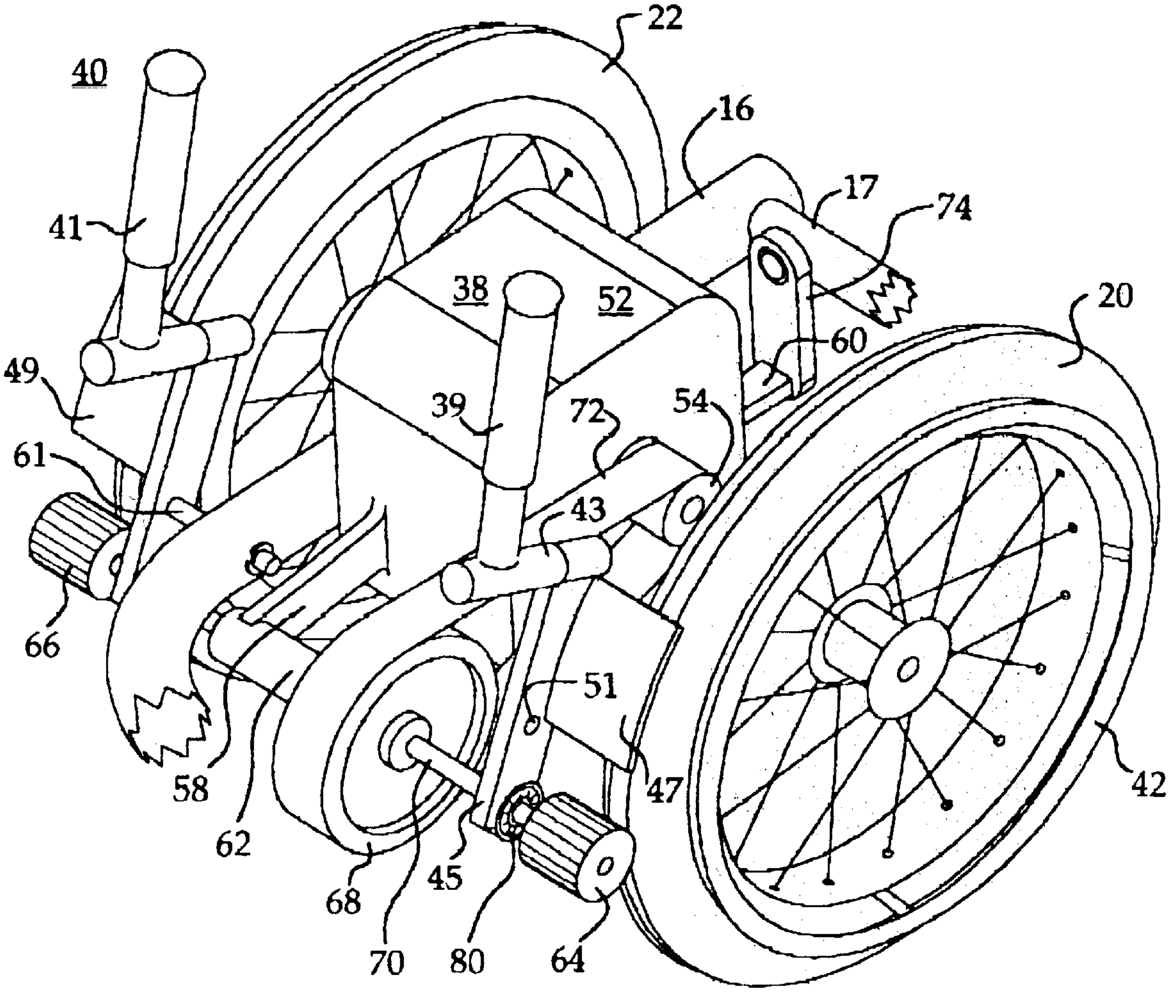
FIG. 3 is a partial isometric view of the power chair of the invention.

A steering and propulsion control arrangement includes a pair of manual control arms 38 and 40 which are substantially identical. Only control arm 38 will be described in detail. As best seen in FIGS. 1 and 3, control arm 38 comprises a lever arrangement that includes a handle 39, a horizontal member 43 and a rocker lever 45, which is secured to leg 14 of frame 12 by a pivot 51. (The opposite side rocker lever is similarly secured to leg 16 by a pivot 61.) Rocker lever 45 carries a brake surface 47 that is located above pivot 51 and which overlies the periphery of wheel 20. Brake surface 47 may comprise any suitable material for frictionally engaging wheel 20. A drive axle 70 passes through a bushing 80 that is flexibly mounted to rocker lever 45 below pivot 51. Drive axle 70 is secured in a driven pulley 68 which is coupled, via a belt 72, to a drive pulley 54 that is driven by a motor 52. A friction roller 64 is secured to the end of drive axle 70 and rotates therewith. Friction roller 64 is engageable with the radial periphery of wheel 20 for imparting a rotational force thereto, whereas brake surface 47 is engageable with the radial periphery of wheel 20 for applying a braking force thereto. (It will be appreciated that the friction roller and brake surface may readily be arranged to engage other portions of wheel 20 and the invention should not be limited to engagement with the radial periphery of the wheel.) Similarly, a friction roller 66 is secured to the other end of the drive axle 70. It will be appreciated by those skilled in the art that the friction rollers may comprise any well-known form of driver elements, such as gear wheels and the like, all within the spirit and scope of the present invention.

Drive axle 70 (and the attached driven pulley 68) is mounted for rotation in a tubular bearing member 62 that is affixed to one end of motor 52 by a pair of horizontally disposed supports 56 and 58. Motor 52 is secured at its other end to frame member 17 through a rigid member 60 and a flexible member 74, as best shown in FIG. 3. Flexible member 74 may comprise a piece of hard rubber or the like. It will be appreciated that the motor and drive axle support arrangement forms a limited, floating power transmission unit that permits the slight movements required to rocker the friction rollers and brake surfaces into engagement with the corresponding wheels responsive to corresponding forward and backward movements of the handles 39 and 41.

Operation is best described in connection with FIG. 3 where the elements of the power transmission unit are more clearly shown. When motor 52 is operating, it transmits rotary motion to drive axle 70 (and to the friction rollers 64 and 66) through drive pulley 54, belt 72 and driven pulley 68. The control arms 38 and 40 are self centering and, with no force applied to the handles 39 and 41, there is no engagement between the radial peripheries of wheels 20 and 22 and either of the friction rollers 64 and 66, or either of the brake surfaces 47 and 49, respectively. Moving handle 39 forward causes rocker lever 45 to rotate slightly about pivot 51 and force friction roller 64 into driving engagement with wheel 20. The slight angular displacement of drive axle 70 is accommodated by flexibly mounted bushing 80 and its corresponding opposite side flexible bushing, (not shown). Similarly, pulling on handle 39 results in brake surface 47 being forced into engagement with wheel 20. Thus operation of handle 39 controls the propulsion and braking of wheel 20. Similarly, forward and backward movements of the opposite handle 41 result in propulsion and braking of wheel 22. For straight-ahead movement of the power chair, both handles 39 and 41 are pushed forward. For turns, only one of the handles is pushed forward. For very sharp turns, the handles are operated in opposite directions to propel one wheel and simultaneously brake the other wheel. The power chair is stopped by pulling back on both handles.

It will be appreciated that the power transmission unit or system floats on the frame by virtue of the two flexibly mounted bushings and the flexible motor support 74. Caster wheel 30 is freely rotatable and orients itself to the directional movements generated by the wheels 20 and 22. The wheels, which measure eighteen inches in diameter, are small enough so that the power chair, as discussed below, is able to fit within the trunk of a compact automobile. The handles 39 and 41 may be arranged to pivot with respect to horizontal member 43 to fold them down for stowage of the wheelchair. A simple spring-loaded pin and hole lacking arrangement would be suitable for this purpose. With the seat removed and the handles pivoted down, the wheel diameter is the largest vertical demension that needs to be accommodated by the transporting vehicle, which as indicated above may be a compact automobile. The foot platform 36 may also be rotated back about pivot 37 to reduce the length of the power chair for stowage or transport. The provision of wheel hand rings 42 and 44 is for illustrative purposes, since they are not required in the invention.

Figure 4:
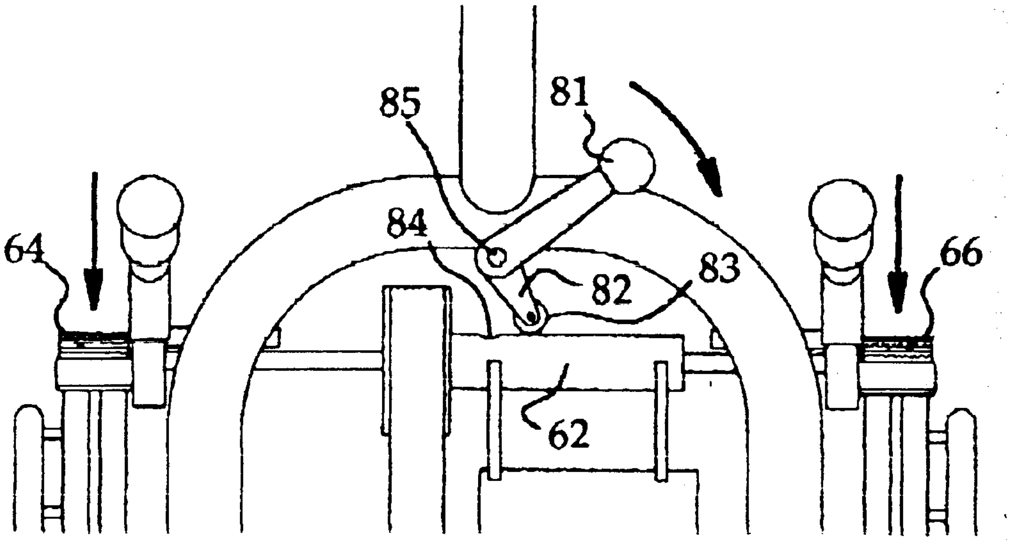
FIG. 4 is a partial plan view of the clutched drive lock arrangement.

In FIG. 4, a clutched drive lock is illustrated for keeping friction rollers 64 and 66 in engagement with the peripheries of wheels 20 and 22. It consists of a handle 81 and a detent lever 82 that are affixed to a common axle 85 which is pivotally mounted to U section of frame 12. Detent lever 82 carries a roller 83 at its end. When a user rotates handle 81, roller 83 forces tubular bearing member 62 to move rearward, forcing friction roller 64 and 66 into engagement with wheels 20 and 22. A locked condition is maintained when roller 83 drops into a depression 84 in tubular bearing member 62. In the locked condition, a user can sustain hands free motorized propulsion while traveling long and straight distances. The arrangement may be spring loaded so that the operation of the handles to brake either or both of the wheels will release roller 83 form depression 84, to disengage the clutched drive lock mechanism.

Figure 5:
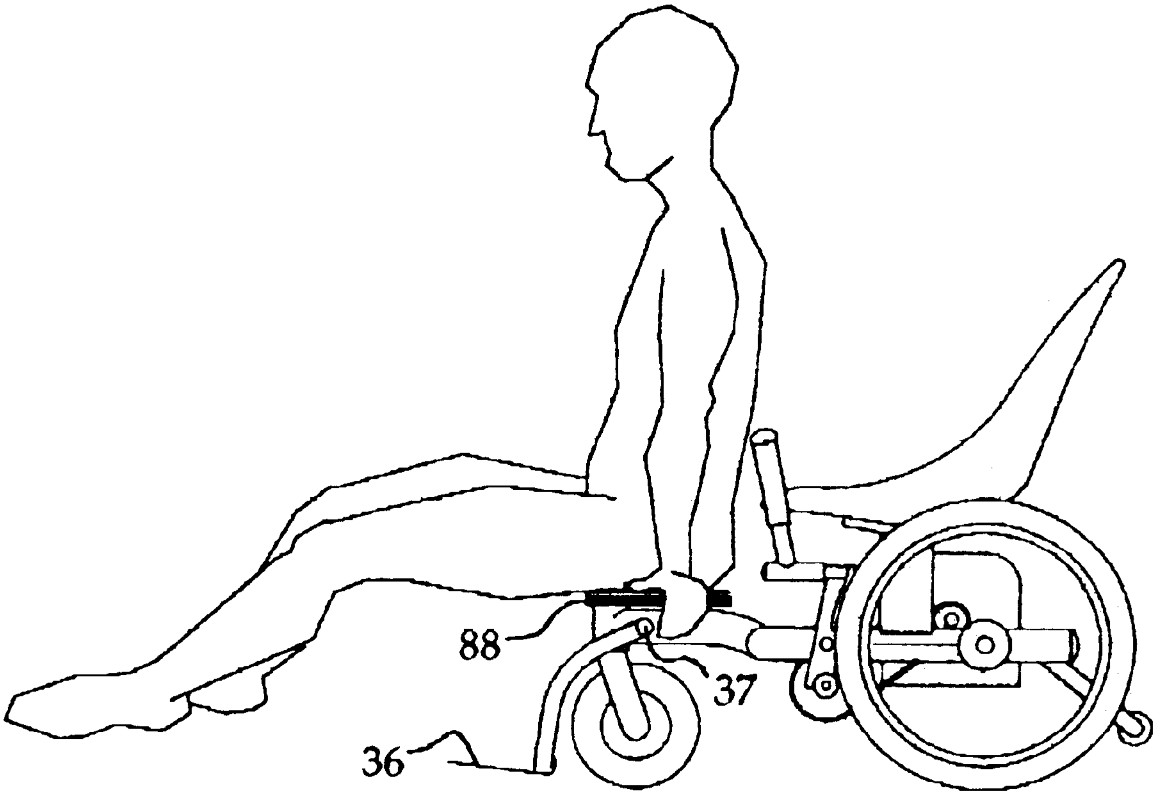
FIG. 5 illustrates the arrangement for enabling disabled persons to more easily dismount from the powered chair version of the invention.

The forwardly extending frame leg 18 is not found in conventional wheelchairs and could pose an impediment to users with disable legs. In FIG. 5, an intermediate padded platform 88 is shown mounted to frame leg 18. The padded platform 88 softens the impact when dismounting and provides an intermediate step to assist in climbing up onto the chair. While not shown, it should be apparent that a speed control of the power chair may be desired and may be readily accomplished by the providing a throttle control that is operable by the user.

What has been described is a novel power chair that is light enough in weight to be hand propelled and readily transportable. It is recognized that numerous changes to the described embodiment of the invention will be apparent to those skilled in the art without departing from its true spirit and scope. Ale invention is to be limited only as defined in the claims.

What is claimed is:

1. A drive system for a power chair having a frame with a front and a rear, two freely rotatable traction wheels on opposite sides of said frame adjacent said rear, a freely movable caster wheel pivotally mounted to said front of said frame and forming a triangular configuration with said traction wheels for providing continuous ground contact with each of said traction wheels, and a seat positioned between said traction wheels and rearwardly of said caster wheel, comprising:

a power unit movably supported on said frame;

a pair of rocker levers pivotally mounted to said frame;

a pair of rotatable friction rollers flexibly supported on said rocker levers, respectively, and drivingly coupled to said power unit;

a pair of friction brake surfaces supported on said rocker levers and engageable with said traction wheels; and a pair of manual control arms, mounted adjacent said seat, coupled to said rocker levers for causing selective engagement between said traction wheels and said friction rollers and between said traction wheels and said friction brake surfaces to effect propulsion and steering of said power chair.

2. The drive system of claim 1, wherein said power unit includes:

a motor, including a drive pulley;

a drove axle coupled to said drive pulley;

said rocker levers being situated on each end of said drive axle; and said drive axle being supported on said frame for rotational movement, and for translational movement toward said traction wheels.

3. The drive system of claim 2, further comprising;

a pair of bushings rotatably supporting said drive axle on said frame at two spaced apart points; and a flexible member supporting said power unit at a third point on said frame.

4. The drive system of claim 3, wherein said traction wheels include resilient tires and wherein said friction rollers are forcibly moved by said manual control arms into engagement with one or both of said resilient tires for propelling and steering said power chair.

5. The drive system of claim 4, wherein said power unit further comprises: and said bushings being flexibly mounted on said rocker levers.

6. The drive system of claim 1, wherein said seat is removable and wherein the diameters of said pair of traction wheels are selected to enable said power chair, with said seat removed, to be transportable in the trunk of a compact automobile.

7. The drive system of claim 1, wherein said power unit comprises a 4 cycle gasoline engine and further comprising:

a pair of bushings flexibly mounted to said rocker levers;

a drive axle affixed to said pair of friction rollers and rotatably supported by said pair of bushings; and a flexible support affixed between said engine and said frame.

* * * * *